June 23, 1925.  R. A. WELLS  1,542,976

MUD HOOK

Filed Feb. 24, 1925

INVENTOR
Ray A. Wells.
BY Arthur E. Brown
ATTORNEY

Patented June 23, 1925.

1,542,976

UNITED STATES PATENT OFFICE.

RAY A. WELLS, OF LUCERNE, MISSOURI.

MUD HOOK.

Application filed February 24, 1925. Serial No. 11,016.

*To all whom it may concern:*

Be it known that I, RAY A. WELLS, a citizen of the United States, residing at Lucerne, in the county of Putnam and State of Missouri, have invented certain new and useful Improvements in Mud Hooks; and I do declare the following to be a full, clear, and exact description of the invention, such as will enable others skilled in the art to which it appertains to make and use the same, reference being had to the accompanying drawings, and to the figures of reference marked thereon, which form a part of this application.

This invention relates to tractor wheels and particularly to a "mud hook" especially adapted to be fastened to the cleats normally on the rim of the wheel, the "mud hook" being especially designed for use in soft ground to prevent the wheel from spinning.

Under ordinary conditions the cleats normally located on the periphery of the wheel are sufficient to afford the necessary traction, but these are not sufficient to prevent the wheel from spinning in mud or soft earth, consequently I have provided an attachment termed a "mud hook" which consists of a bar adapted to be removably secured to the normal cleat and having an end extending at an angle to the cleat but parallel with the axis of the wheel, and the angular end may carry a removable blade, the width of which is greater than the width of the cleat. That is, the blade is in the form of a long wide tooth. It is adapted to be used in very muddy ground where the removable bar does not have sufficient depth to afford the necessary traction.

The novelty of the invention will be specifically described hereinafter, reference being had to the accompanying drawings, in which—

Figures 1, 2:
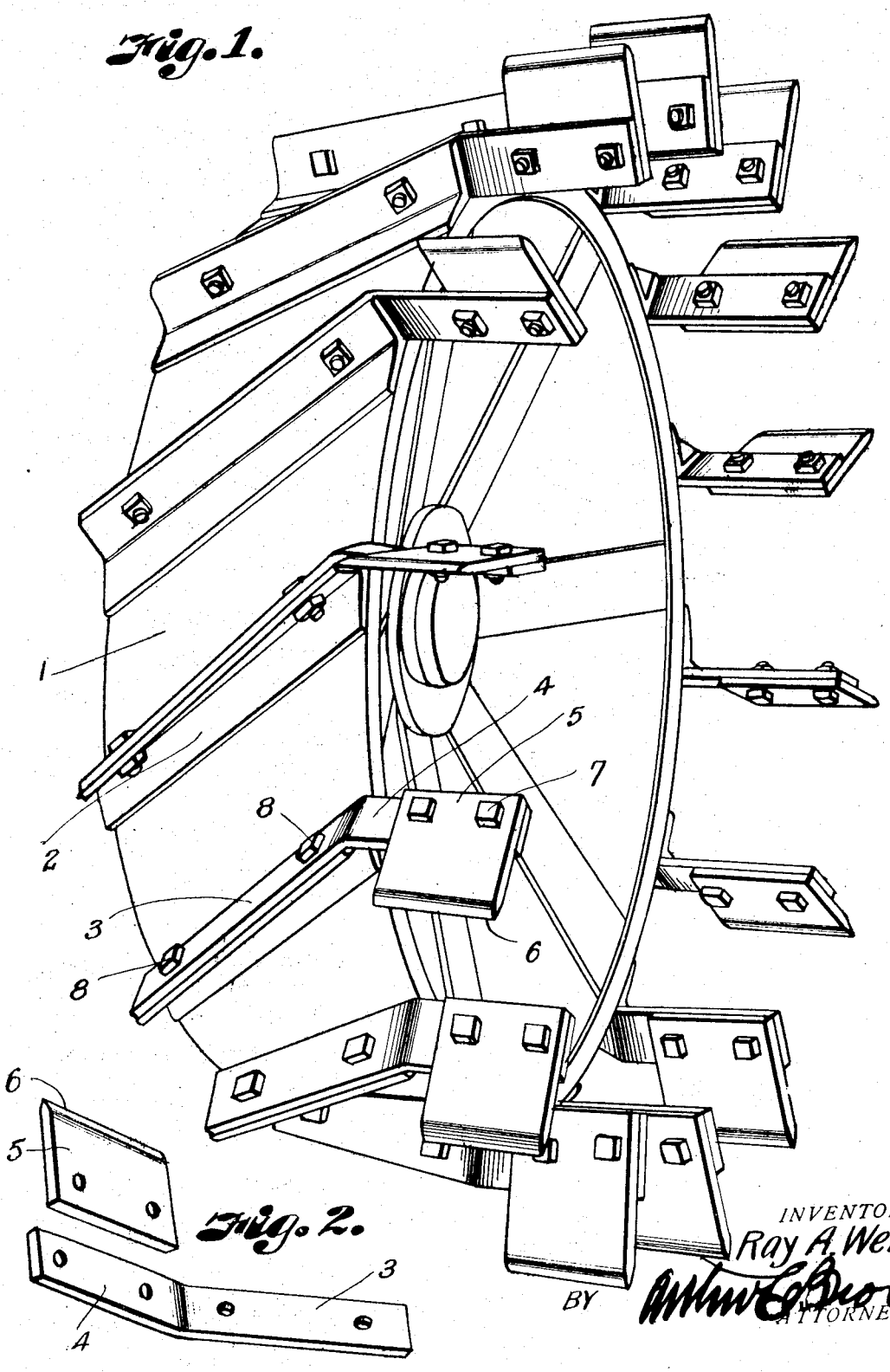
Fig. 1 is a perspective view of a wheel to which my invention is applied.
Fig. 2 is a disassociated, perspective view of the removable bar or arm with the tooth or plate removed.

The tractor wheel 1 and the diagonal cleats 2 on the rim thereof are commonly used on tractors and this construction constitutes no part of my invention. The cleats 2 are usually made of angle iron, one flange being suitably fastened to the rim of the wheel either by welding, bolting or other suitable means, and one flange extends outwardly to form a blade or edge to dig into the ground to afford the necessary traction for the vehicle. Such a construction admirably serves the purpose for which it is intended except in soft earth, then the surface of the angle cleats appears not to be sufficient and as a result the wheel frequently spins. In other words, the vehicle loses traction and cannot move forward or backward.

My invention consists in providing an easily attachable and readily removable "mud hook" consisting of an arm or bar 3 having a length co-extensive with the cleat 2 to which it is attached and an integral, angular extension 4 which projects beyond the side edge of the wheel rim in a plane parallel to the axis of the wheel. The extension 4 carries a removable mud engaging blade or tooth 5 having a length in excess of the widths of both the cleat 2 and the bar 3. The edge of the tooth 5 is preferably bevelled as at 6. The tooth is fastened to the extensions by bolts 7 and similar bolts are used for removably securing the bar 3 to the cleat 2, these bolts being designated by the reference numeral 8.

Under ordinary conditions the bar 3 and the tooth 5 will not be used on the wheel, the cleats 2 affording the necessary traction. When, however, soft ground is encountered it may be necessary to apply the bar 3, with or without the teeth 5, but in very soft ground the teeth 5 will be employed.

One of the important features of my invention is the construction which enables the operator to easily apply the attachment and take it off the wheel, and another important feature is the fact that the attachment can be applied to the ordinary cleat without boring holes in the rim or reconstructing it to adapt itself to the attachment.

What I claim and desire to secure by Letters Patent is:—

1. A mud hook attachment for tractors comprising a flat bar having an end portion extending from the main body portion at an angle thereto, the end portion having an edge to cut into the ground, and a removable flat plate carried by the end portion, the plate constituting a tooth of greater width than the width of the bar.

2. In combination with a tractor wheel having diagonal cleats on the rim thereof, mud-hook attachments for said cleats, the mud-hook attachments comprising bars having body portions adapted to lie flat against the cleats, provided with extensions at angles to the body portions in planes parallel to the axis of the wheel extending beyond the side of the wheel, and removable teeth on the extensions of greater lengths than the width of the cleats and the body portions of the bars.

In testimony whereof I affix my signature.

RAY A. WELLS.